United States Patent
Nian et al.

(10) Patent No.: US 10,921,637 B2
(45) Date of Patent: Feb. 16, 2021

(54) DISPLAY DEVICE AND MANUFACTURING METHOD OF POLARIZER STRUCTURE

(71) Applicant: Au Optronics Corporation, Hsinchu (TW)

(72) Inventors: Han-Sheng Nian, Hsinchu (TW); Li-Kai Chia, Hsinchu (TW); Yu-Cheng Shih, Hsinchu (TW); Wei-Syun Wang, Hsinchu (TW); Shan-Ying Chou, Hsinchu (TW); Jen-Kuei Lu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/408,467

(22) Filed: May 10, 2019

(65) Prior Publication Data

US 2020/0183225 A1    Jun. 11, 2020

(30) Foreign Application Priority Data

Dec. 11, 2018   (TW) .................................. 107144643

(51) Int. Cl.
*G02F 1/1335*     (2006.01)
*G02F 1/13357*    (2006.01)

(52) U.S. Cl.
CPC .. *G02F 1/133526* (2013.01); *G02F 1/133509* (2013.01); *G02F 1/133528* (2013.01); *G02F 1/133553* (2013.01); *G02F 1/133602* (2013.01)

(58) Field of Classification Search
CPC ......... G02F 1/133526; G02F 1/133509; G02F 1/133528; G02F 1/133553; G02F 1/133602
See application file for complete search history.

(56) References Cited

U.S. PATENT DOCUMENTS

| | | |
|---|---|---|
| 7,502,156 B2 | 3/2009 | Tonar et al. |
| 7,903,335 B2 | 3/2011 | Nieuwkerk et al. |
| (Continued) | | |

FOREIGN PATENT DOCUMENTS

| | | |
|---|---|---|
| CN | 100474006 | 4/2009 |
| CN | 205920295 | 2/2017 |

OTHER PUBLICATIONS

Kim et al.; Nanotechnology 17 (2006) 4436-4438: "Fabrication of a nano-wire grid polarizer for brightness enhancement in liquid crystal display".*

(Continued)

*Primary Examiner* — Hoan C Nguyen
(74) *Attorney, Agent, or Firm* — JCIPRNET

(57) ABSTRACT

A display device includes a liquid crystal display module, a cover lens, and a polarizer structure. The liquid crystal display module has a display area and a non-display area connected to the display area. The liquid crystal display module includes a bezel, a backlight module, and a display panel. The display panel includes a first substrate, a lower polarizer, a second substrate, a liquid crystal layer, and a filter element. The polarizer structure is located between the cover lens and the second substrate. The polarizer structure includes a plurality of grids and a reflective layer. The grids cover the display area. The reflective layer surrounds the grids and covers a sidewall of the display panel and a sidewall of the bezel in a direction perpendicular to the cover lens. A manufacturing method of the polarizer structure is also provided.

9 Claims, 9 Drawing Sheets

(56) References Cited

U.S. PATENT DOCUMENTS

| | | | |
|---|---|---|---|
| 9,268,075 B1* | 2/2016 | Yoon | G02B 5/3058 |
| 2007/0041096 A1 | 2/2007 | Nieuwkerk et al. | |
| 2008/0068520 A1 | 3/2008 | Minikey et al. | |
| 2012/0206580 A1* | 8/2012 | Chung | G02F 1/133533 |
| | | | 348/57 |
| 2015/0198833 A1* | 7/2015 | Chung | G02F 1/133605 |
| | | | 349/67 |
| 2015/0234230 A1* | 8/2015 | Hirata | H04N 9/3167 |
| | | | 349/96 |
| 2016/0026039 A1* | 1/2016 | Sakai | G02F 1/133555 |
| | | | 345/1.3 |
| 2016/0077265 A1* | 3/2016 | Choi | G02F 1/133528 |
| | | | 430/321 |
| 2016/0313601 A1* | 10/2016 | Nam | G02F 1/133512 |
| 2017/0052287 A1* | 2/2017 | Lee | G02B 6/00 |
| 2017/0097543 A1* | 4/2017 | Kang | H01L 27/1262 |
| 2017/0176661 A1* | 6/2017 | Lee | G02F 1/133377 |
| 2017/0320441 A1* | 11/2017 | Luten | B60R 1/088 |
| 2018/0173049 A1* | 6/2018 | Zha | G02F 1/133528 |
| 2019/0187350 A1* | 6/2019 | Yoshikawa | G02B 5/3058 |

OTHER PUBLICATIONS

Yang et al.; IEEE Photonics Technology Letters, vol. 20, No. 9, May 1, 2008; "Broadband Polarizers Using Dual-Layer Metallic Nanowire Grids".*

"Written Opinion and Search Report of Singapore Counterpart Application", dated Jul. 6, 2020, p. 1-p. 10.

* cited by examiner

DISPLAY DEVICE AND MANUFACTURING METHOD OF POLARIZER STRUCTURE

CROSS-REFERENCE TO RELATED APPLICATION

This application claims the priority benefit of Taiwan application serial no. 107144643, filed on Dec. 11, 2018. The entirety of the above-mentioned patent application is hereby incorporated by reference herein and made a part of this specification.

BACKGROUND OF THE INVENTION

Field of the Invention

The invention relates to a manufacturing method of a display device and a polarizer structure, and more particularly, to a display device for which the polarizer structure includes grids and a reflective layer and a manufacturing method of the polarizer structure.

Description of Related Art

The current e-mirror is formed by providing a liquid crystal display module in the rearview mirror, so that the rearview mirror may display an image via the liquid crystal display module in addition to having a mirror function. The e-mirror has a wider field of view than the conventional rearview mirror without a liquid crystal display module, which may greatly improve the user's driving safety.

However, in the existing e-mirror, a masking ink layer is usually disposed on the non-display area of the transflective mirror cover lens above the liquid crystal display module to prevent the components below the non-display area from being visible. In addition, the transflective coating layer of the existing e-mirror used to reflect light greatly reduces the transmittance of the liquid crystal display module.

SUMMARY OF THE INVENTION

The invention provides a display device with a low manufacturing cost and a display screen with improved brightness.

The invention provides a manufacturing method of a polarizer structure with a low manufacturing cost.

At least one embodiment of the invention provides a display device including a liquid crystal display module, a cover lens, and a polarizer structure. The liquid crystal display module has a display area and a non-display area connected to the display area. The liquid crystal display module includes a bezel, a backlight module, and a display panel. The backlight module is located in the bezel. The display panel is located on the backlight module. The display panel includes a first substrate, a lower polarizer, a second substrate, a liquid crystal layer, and a filter element. The lower polarizer is located on the first substrate. The second substrate faces the first substrate. The liquid crystal layer is located between the first substrate and the second substrate. The filter element is located between the first substrate and the second substrate. The cover lens is located on the liquid crystal display module. The polarizer structure is located between the cover lens and the second substrate. The polarizer structure includes a plurality of grids and a reflective layer. The grids cover the display area. The reflective layer surrounds the grids and covers a sidewall of the display panel and a sidewall of the bezel in a direction perpendicular to the cover lens.

At least one embodiment of the invention provides a manufacturing method of a polarizer structure, including the following steps. A first mold material layer is formed on a substrate. A hard mask layer is formed on the first mold material layer, wherein the hard mask layer has a first region and a second region surrounding the first region, and a thickness of the second region is greater than a thickness of the first region. A patterned first photoresist material layer is formed on the hard mask layer. The hard mask layer and the first mold material layer are etched to form a first mold. A second mold is formed by using the first mold as a master mold. A reflective material layer is formed on the cover lens. A second photoresist material layer is formed on the reflective material layer. A pattern of the second mold is transferred onto the second photoresist material layer to form a patterned second photoresist material layer. The reflective material layer is etched to form a plurality of grids and a reflective layer surrounding the grids.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

FIG. 1A to FIG. 1I are top views of a manufacturing method of a display device according to an embodiment of the invention. FIG. 2A to FIG. 2I are respectively cross sections along section line aa' of FIG. 1A to FIG. 1I.

Figure 1A:
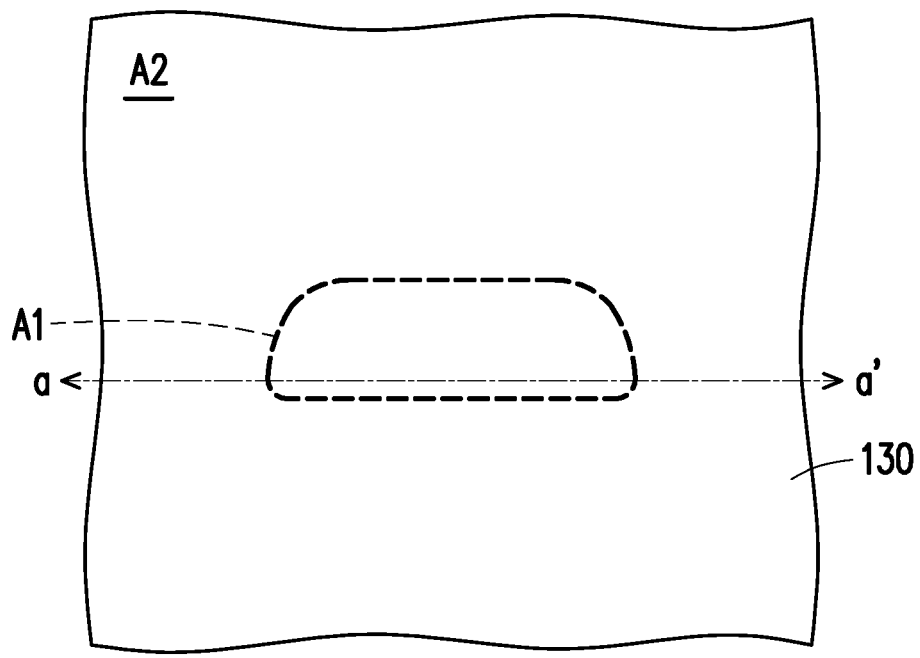
FIG. 1A to FIG. 1I are top views of a manufacturing method of a display device according to an embodiment of the invention.
Figure 2A:
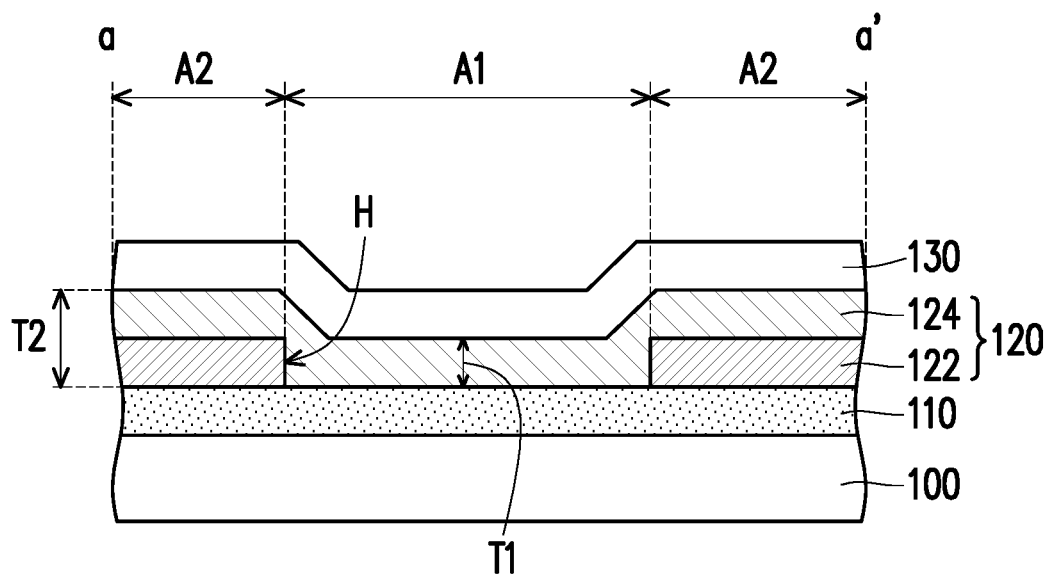
FIG. 2A to FIG. 2I are respectively cross sections along section line aa' of FIG. 1A to FIG. 1I.

Referring to FIG. 1A and FIG. 2A, a first mold material layer 110 is formed on a substrate 100. In some embodiments, the material of the first mold material layer 110 includes silicon dioxide or other materials that may be etched.

A hard mask layer 120 is formed on the first mold material layer 110. The hard mask layer 120 has a first region A1 and a second region A2 surrounding the first region A1. A thickness T2 of the second region A2 is greater than a thickness T1 of the first region A1. The hard mask layer 120 includes a first mask layer 122 and a second mask layer 124. The first mask layer 122 is located in the second region A2 and has an opening H corresponding to the first region A1. The second mask layer 124 covers the first mask layer 122 and is located in the opening H. In the present embodiment, the thickness T1 of the first region A1 is equal to the thickness of the second mask layer 124, and the thickness T2 of the second region A2 is equal to the thicknesses of the first mask layer 122 and the second mask layer 124. In some embodiments, the material of the first mask layer 122 and the second mask layer 124 includes aluminum, titanium, molybdenum, or other suitable materials, or a combination of the above materials. A first photoresist material layer 130 is formed on the hard mask layer 120.

Figure 1B:
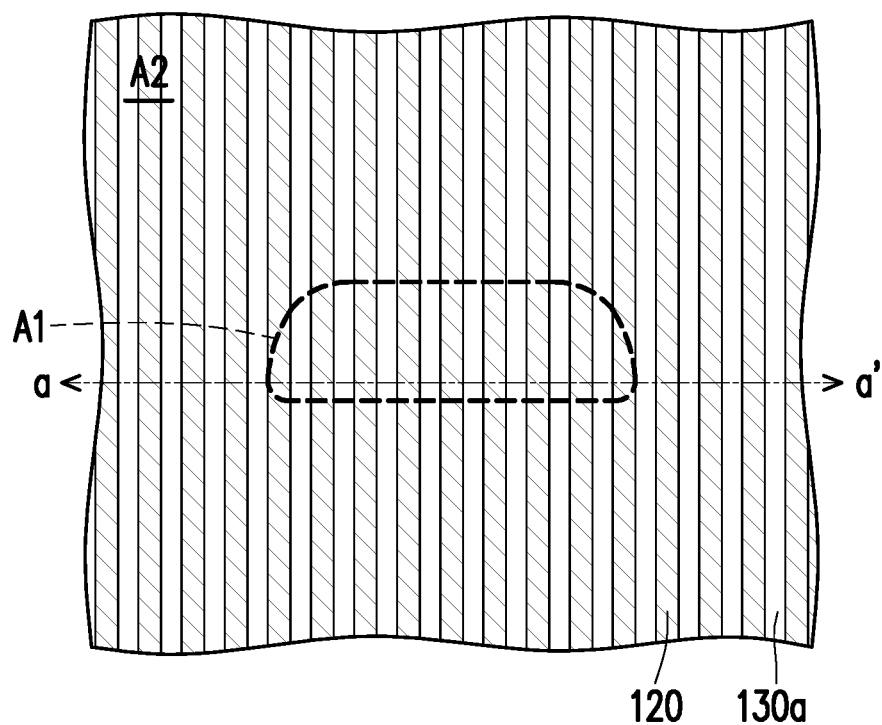
Figure 2B:
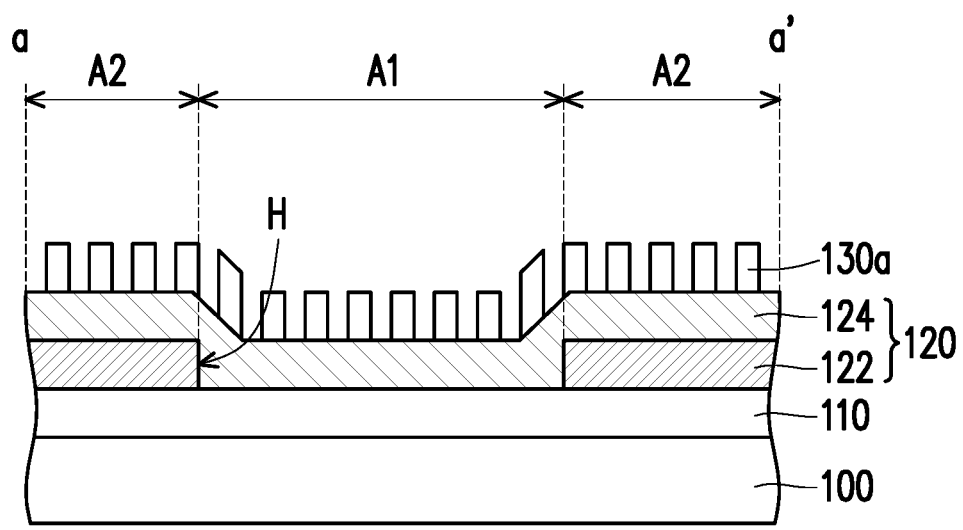

Referring to FIG. 1B and FIG. 2B, the first photoresist material layer 130 is patterned to form a patterned first photoresist material layer 130a on the hard mask layer 120. In some embodiments, the coating thickness of the patterned first photoresist material layer 130a is less than the thickness of the first mold material layer 110. For example, the coating thickness of the patterned first photoresist material layer 130a is half the thickness of the first mold material layer 110. In other words, the coating thickness of the first photoresist material layer 130 is half the thickness of the first mold material layer 110, but the invention is not limited thereto. In the present embodiment, the method of forming the patterned first photoresist material layer 130a is, for example, nanoimprint lithography (NIL). In some embodiments, the difference between the thickness of the first mask layer 122 and the thickness of the patterned first photoresist material layer 130a is less than 50 nm (e.g., between 10 nm and 50 nm), and the difference between the thickness of the second mask layer 124 and the thickness of the patterned first photoresist material layer 130a is less than 50 nm (e.g., between 10 nm and 50 nm), which facilitates the subsequent etching process needed for the forming of a polarizer structure.

Figure 1C:
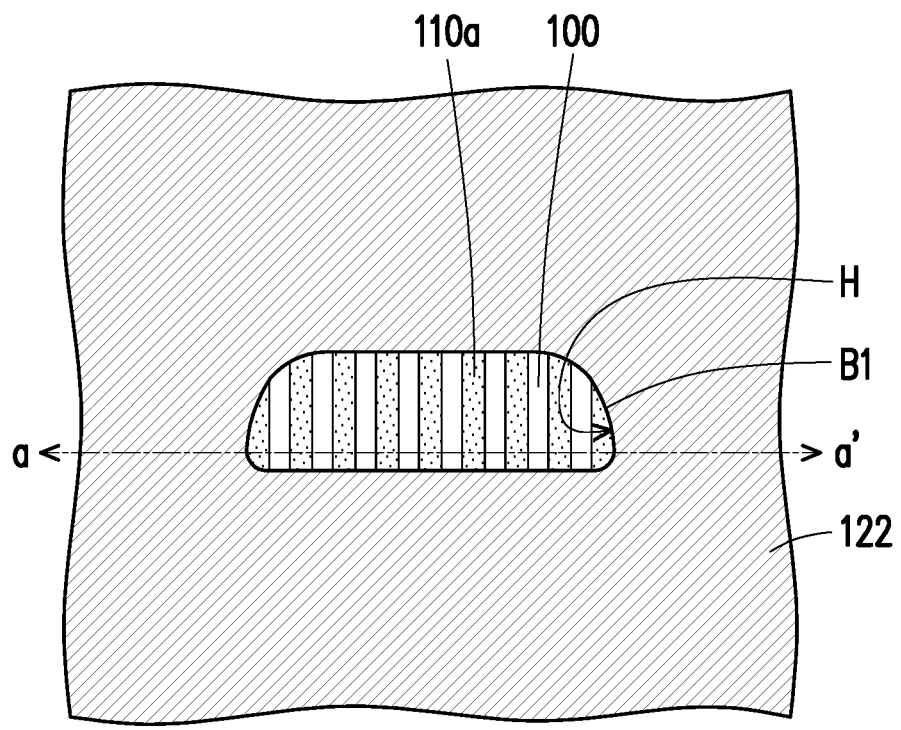
Figure 2C:
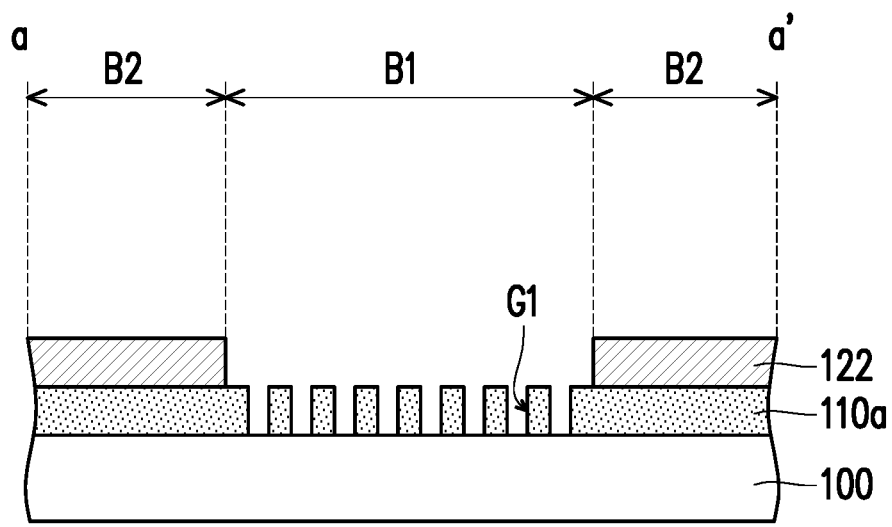
Figure 2D:
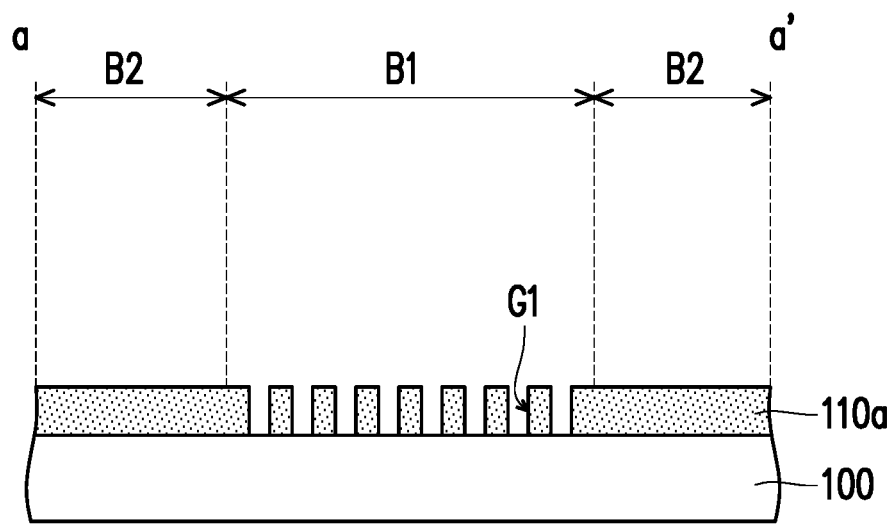
Figure 2E:
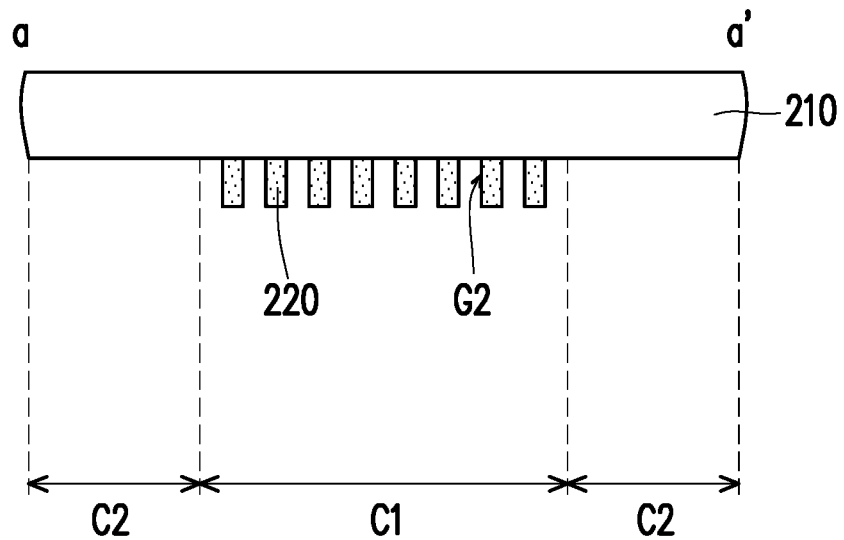
Figure 2F:
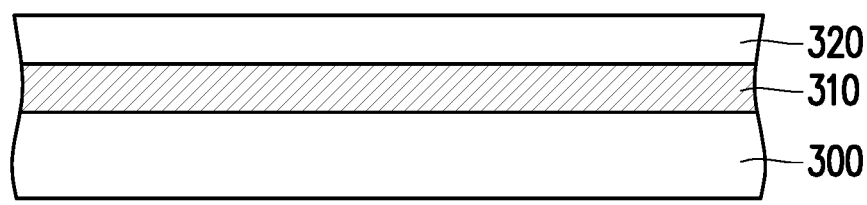
Figure 2G:
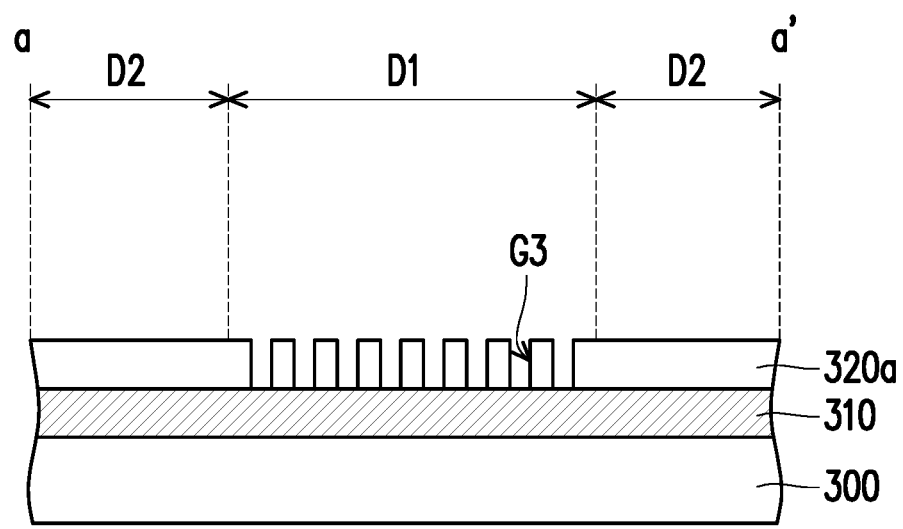

Referring to FIG. 1C and FIG. 2C, the hard mask layer 120 and the first mold material layer 110 are etched to form a first mold 110a. In the present embodiment, with the hard mask layer 120 and the patterned first photoresist material layer 130a as a mask, after the first mold material layer 110 is etched to form the first mold 110a, a portion of the hard mask layer 120 (e.g., a portion of the first mask layer 122) still remains on the first mold 110a, but the invention is not limited thereto. In the present embodiment, since the thickness T2 of the second region A2 of the hard mask layer 120 is larger than the thickness T1 of the first region A1 of the hard mask layer 120, the first mold 110a has a first region B1 and a second region B2 having different patterns. A plurality of grooves G1 are located in the first region B1 corresponding to the first region A1, and there are no grooves in the second region B2 corresponding to the second region A2.

Referring to FIG. 1D, FIG. 1E, FIG. 2D, and FIG. 2E, a portion of the hard mask layer 120 (e.g., a portion of the first mask layer 122) remaining on the first mold 110a is removed. A second mold 200 is formed by using the first mold 110a as a master mold.

In the present embodiment, the second mold 200 includes a substrate 210 and a bump structure 220 located on the substrate 210. The pattern of the bump structure 220 in the second mold 200 is imprinted from the first mold 110a. For example, the first mold 110a has the first region B1 and the second region B2 having different patterns, wherein the plurality of grooves G1 are located in the first region B1. Therefore, the second mold 200 also has a first region C1 and a second region C2 having different patterns, wherein there is plurality of grooves G2 in the first region C1 corresponding to the first region B1, and there are no grooves in the second region C2 corresponding to the second region B2.

In some embodiments, the second mold 200 includes a soft material, but the invention is not limited thereto. In some embodiments, the material of the substrate 210 includes polyethylene terephthalate (PET), glass, polydimethylsiloxane (PDMS), or other suitable materials. In some embodiments, the material of the bump structure 220 includes a photoresist, polydimethylsiloxane (PDMS), or other suitable materials.

Referring to FIG. 1E to FIG. 1G and FIG. 2E to FIG. 2G, a reflective material layer 310 is formed on a cover lens 300. A second photoresist material layer 320 is formed on the reflective material layer 310. The pattern of the second mold 200 is transferred onto the second photoresist material layer 320 to form a patterned second photoresist material layer 320a. In some embodiments, the coating thickness of the patterned second photoresist material layer 320a is less than the thickness of the reflective material layer 310. For example, the coating thickness of the patterned second photoresist material layer 320a is half the thickness of the reflective material layer 310. In other words, the coating thickness of the second photoresist material layer 320 is half the thickness of the reflective material layer 310, but the invention is not limited thereto. Since the second mold 200 has the first region C1 and the second region C2 having different patterns, the patterned second photoresist material layer 320a also has a first region D1 and a second region D2 having different patterns, wherein a plurality of grooves G3 are located in the first region D1 corresponding to the first region C1, and there are no grooves in the second region D2 corresponding to the second region C2.

Figure 1D:
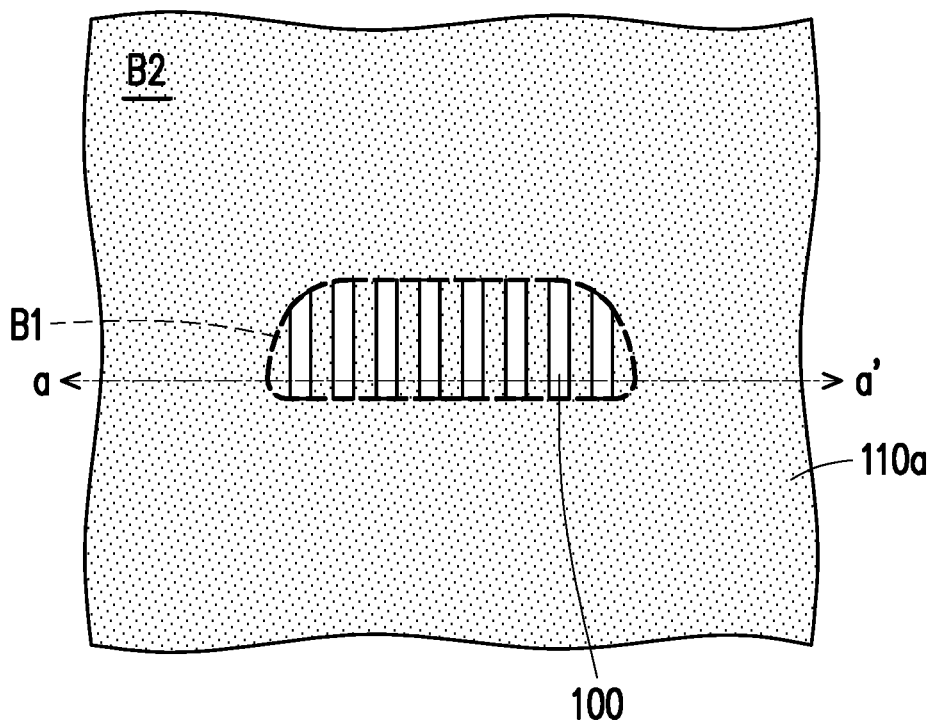
Figure 1E:
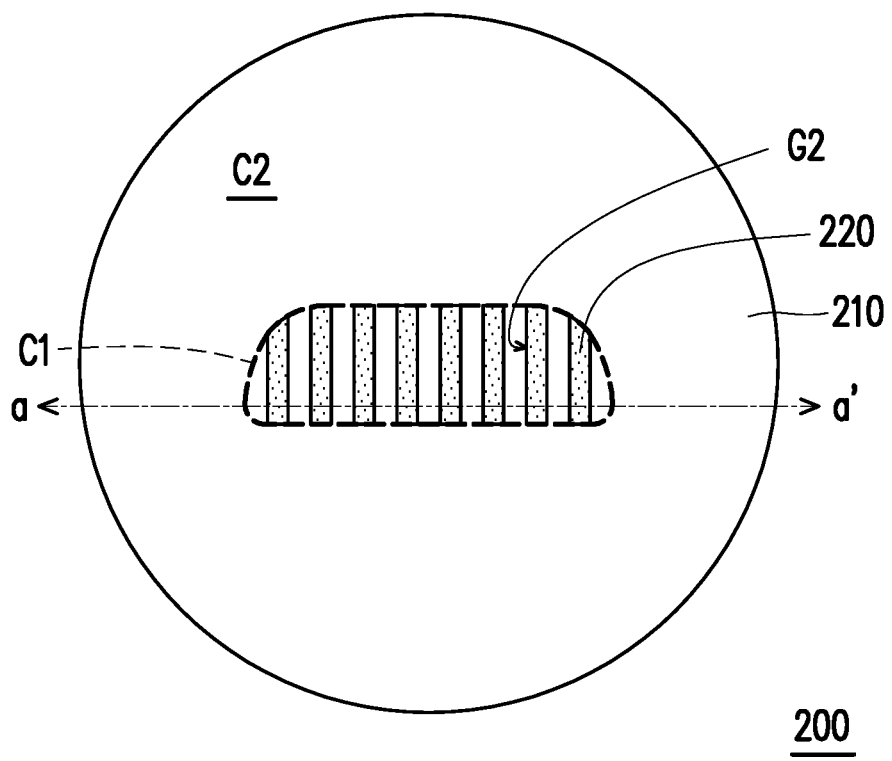
Figure 1F:
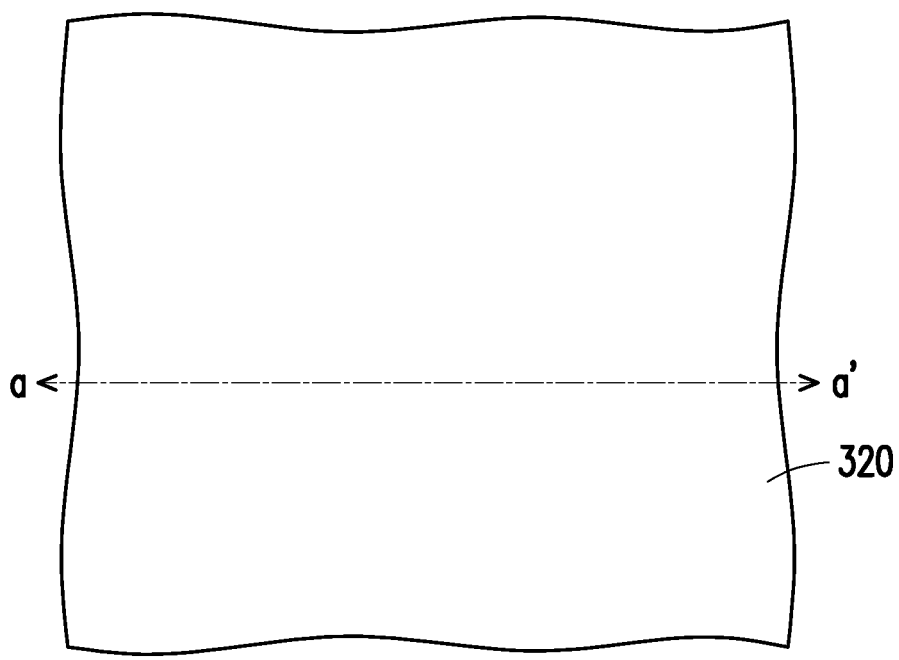
Figure 1G:
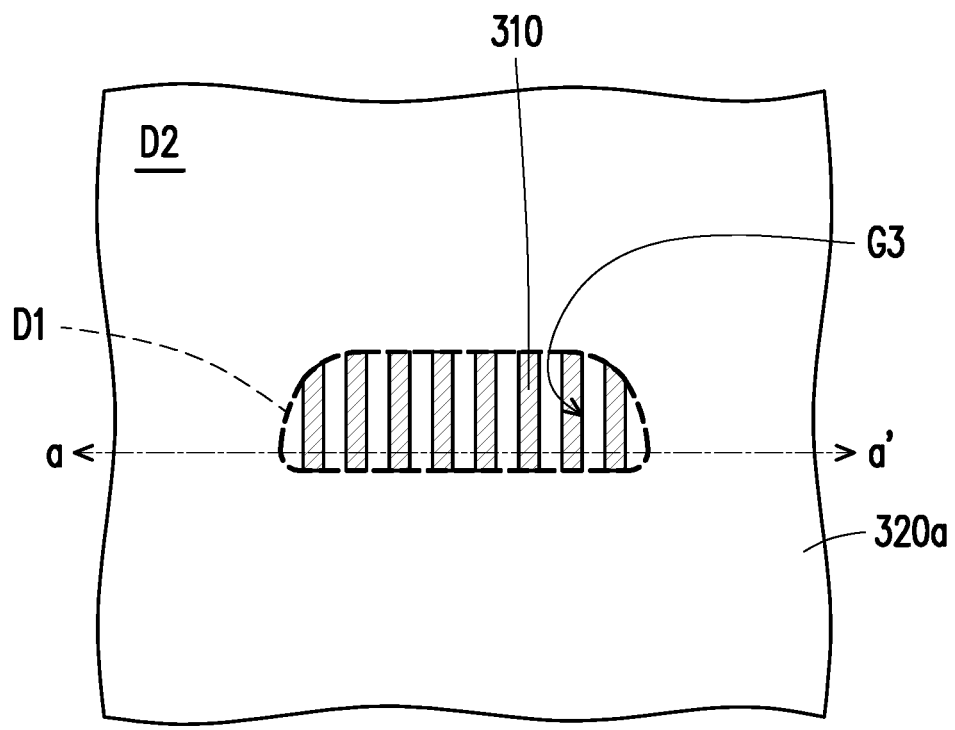
Figure 1H:
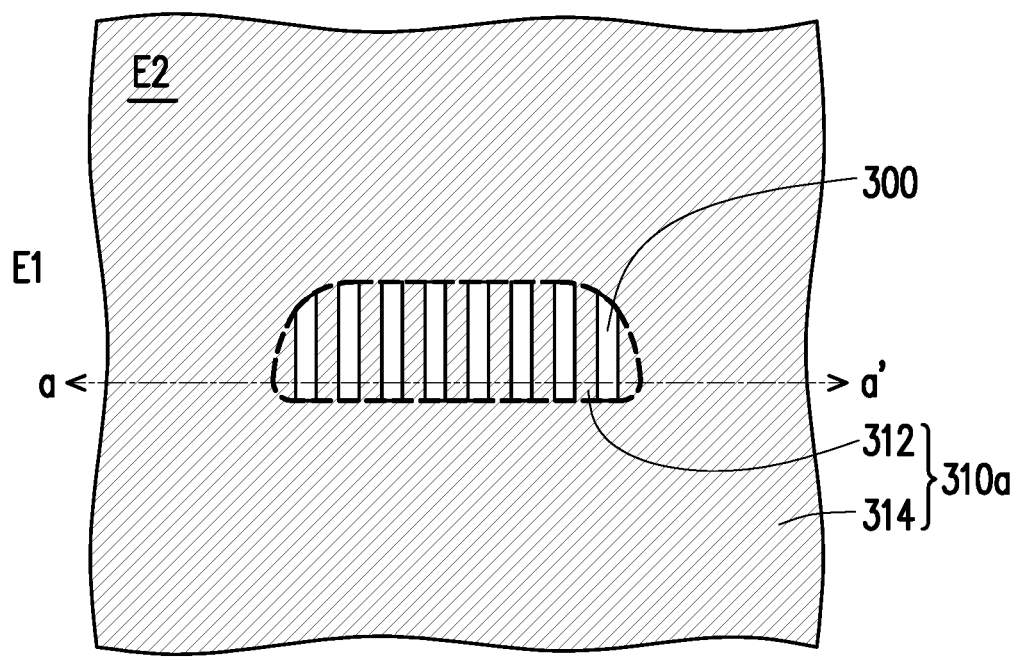
Figure 2H:
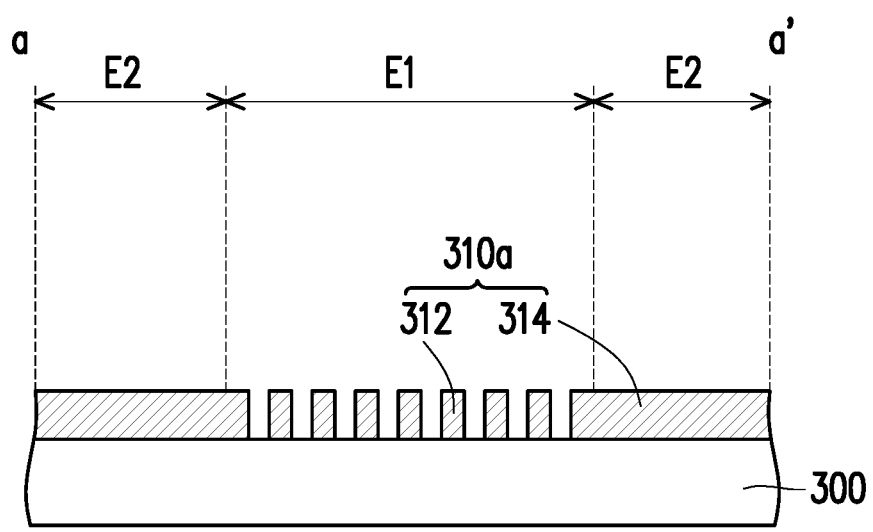

Referring to FIG. 1H and FIG. 2H, with the patterned second photoresist material layer 320a as a mask, the reflective material layer 310 is etched to form a polarizer structure 310a. The polarizer structure 310a includes a plurality of grids 312 and a reflective layer 314 surrounding the plurality of grids 312. The grids 312 are integrally formed with the reflective layer 314, for example. Since the second mold 200 has the first region D1 and the second region D2 having different patterns, the polarizer structure 310a includes a first region E1 and a second region E2 having different patterns, wherein there are the plurality of grids 312 in the first region E1 corresponding to the first region D1, and the reflective layer 314 is located in the second region E2 corresponding to the second region D2. In some embodiments, the material of the polarizer structure 310a includes aluminum, silver, or other reflective materials.

In the present embodiment, the range of the first region E1 is approximately equal to the range of the opening H of the first mask layer 122 (shown in FIG. 1A).

Figure 1I:
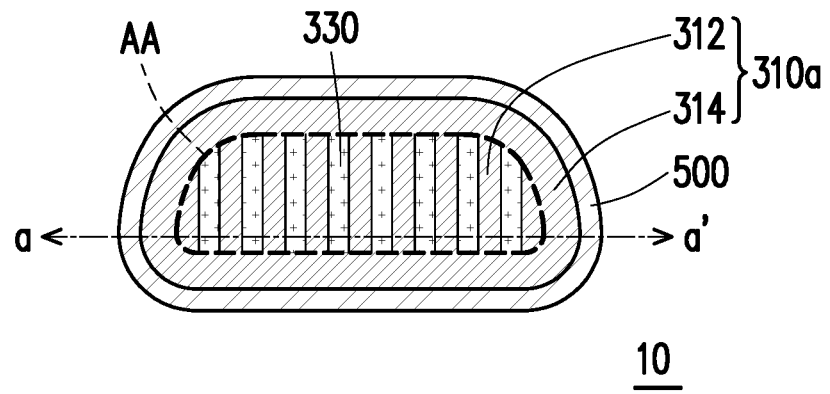
Figure 2I:
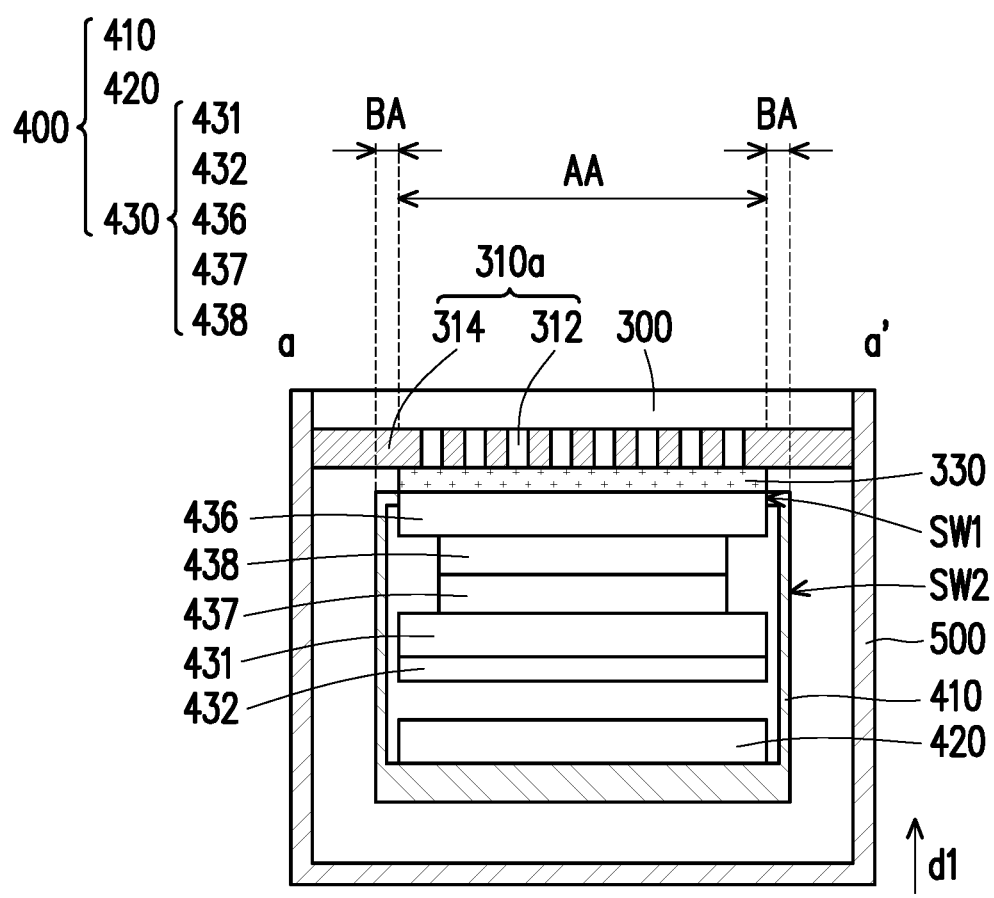

For ease of description, FIG. 1I omits the cover lens 300. Referring to FIG. 1I and FIG. 2I, the cover lens 300 and the polarizer structure 310a are cut into a predetermined shape and attached to a liquid crystal display module 400. The liquid crystal display module 400, the cover lens 300, and the polarizer structure 310a are disposed in a casing 500. At this point, the display device 10 is roughly completed.

The liquid crystal display module 400 has a display area AA and a non-display area BA connected to the display area AA. The liquid crystal display module 400 includes a bezel 410, a backlight module 420, and a display panel 430. The backlight module 420 is located in the bezel 410. The display panel 430 is located on the backlight module 420. The display panel 430 includes a first substrate 431, a lower polarizer 432, a second substrate 436, a liquid crystal layer 437, and a filter element 438. The lower polarizer 432 is located on the first substrate 431. The second substrate 436 faces the first substrate 431. The liquid crystal layer 437 is located between the first substrate 431 and the second substrate 436. The filter element 438 is located between the first substrate 431 and the second substrate 436. In the present embodiment, the first substrate 431 is a pixel array substrate including a plurality of pixel structures. In some embodiments, the lower polarizer 432 includes a wire grid polarizer (WGP) or a polarizing film.

The cover lens 300 is located on the liquid crystal display module 400. The polarizer structure 310a is located between the cover lens 300 and the second substrate 436. The grids 312 of the polarizer structure 310a cover the display area AA. The reflective layer 314 surrounds the grids 312 and covers a sidewall SW1 of the display panel 430 and a sidewall SW2 of the bezel 410 in a direction dl perpendicular to the cover lens 300. In other words, at least the area between the sidewall SW1 of the display panel 430 and the sidewall SW2 of the bezel 410 is covered by the reflective layer 314, thereby masking the circuit (not shown) between the liquid crystal display module 400 and the reflective layer 314. In the present embodiment, the reflective layer 314 is extended beyond the sidewall SW2 of the bezel 410 to more comprehensively mask the circuit (not shown) between the liquid crystal display module 400 and the reflective layer 314.

In the present embodiment, since the polarizer structure 310a includes the reflective layer 314, it is not necessary to additionally form an ink layer to mask the circuit between the liquid crystal display module 400 and the reflective layer 314, thereby reducing the manufacturing cost of the liquid crystal display module 400.

In the present embodiment, the optical adhesive 330 is connected to the polarizer structure 310a and the second substrate 436. The optical adhesive 330 is located between the display area AA and the grids 312 of the polarizer structure 310a. Via the configuration of the optical adhesive 330, the display device 10 may have a better contrast value.

In the present embodiment, since the grids 312 of the polarizer structure 310a have the function of a polarizer, it is not necessary to additionally provide an upper polarizer in the display panel 430, and therefore the manufacturing cost of the display panel 430 may be reduced. In addition, since the upper polarizer is not omitted, the display device 10 may have a higher transmittance.

In the present embodiment, the grids 312 and the reflective layer 314 of the polarizer structure 310a may both reflect light. Therefore, the polarizer structure 310a may be used as a mirror coating to reflect external light. In some embodiments, the display device 10 is an e-mirror.

Based on the above, the polarizer structure of the display device of the invention may be used as a polarizer and a mirror coating. In addition to reducing the manufacturing cost of the display device, the display device may have higher transmittance.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display device, comprising:
    a liquid crystal display module, wherein the liquid crystal display module has a display area and a non-display area connected to the display area, and the liquid crystal display module comprises:
        a bezel;
        a backlight module located in the bezel; and
        a display panel located on the backlight module, and the display panel comprises:
            a first substrate;
            a lower polarizer located on the first substrate;
            a second substrate facing the first substrate;
            a liquid crystal layer located between the first substrate and the second substrate; and
            a filter element located between the first substrate and the second substrate;
    a cover lens located on the liquid crystal display module;
    a polarizer structure located between the cover lens and the second substrate, wherein the polarizer structure comprises:
        a plurality of grids covering the display area; and
        a reflective layer surrounding the grids and covering a sidewall of the display panel and a sidewall of the bezel in a direction perpendicular to the cover lens, wherein the plurality of grids and the reflective layer are disposed on the same layer, and the plurality of grids and the reflective layer are a continuous layer; and
    a casing, wherein the liquid crystal display module and the bezel are disposed in the casing, and the reflective layer is disposed between the casing and the plurality of grids in a first direction and the grids and the reflective layer are not overlapped in a second direction, wherein the first direction is parallel to the cover lens and the second direction is perpendicular to the cover lens, and the first direction is perpendicular to the second direction.

2. The display device of claim 1, wherein the cover lens has an outer surface and an inner surface opposite to the outer surface of the cover lens, the sidewall of the casing has an outer surface, an inner surface opposite to the outer surface of the sidewall of the casing, and a top surface connected with the outer surface of the sidewall of the casing and the inner surface of the sidewall of the casing, wherein the top surface of the sidewall of the casing is substantially parallel to the outer surface of the cover lens, wherein the outer surface of the cover lens is coplanar with the top surface of the sidewall of the casing, and the polarizer structure is disposed on the inner surface of the cover lens.

3. The display device of claim 1, wherein a material of the polarizer structure comprises aluminum or silver.

4. The display device of claim 1, further comprising an optical adhesive connected to the polarizer structure and the second substrate, and the optical adhesive is located between the display area and the grids.

5. The display device of claim 1, wherein the display panel does not have an upper polarizer disposed between the lower polarizer and the optical adhesive.

6. The display device of claim 1, wherein the reflective layer is extended beyond the sidewall of the bezel.

7. The display device of claim 1, wherein an outer of the sidewall of the cover lens and an outer of the sidewall of the reflective layer are contacted with an inner of the sidewall of the casing.

8. The display device of claim 1, wherein the casing contains the cover lens, the polarizer structure, the bezel, the backlight module and the display panel.

9. The display device of claim 1, wherein the bezel contains the display panel and the backlight module.

* * * * *